(12) United States Patent
Park

(10) Patent No.: US 7,213,215 B2
(45) Date of Patent: May 1, 2007

(54) APPARATUS AND METHOD FOR CONTROLLING POSITION OF IMAGE WHEN THE IMAGE ENLARGED OR REDUCED

(75) Inventor: Byeong-chan Park, Seongnam-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 7 days.

(21) Appl. No.: 11/071,927

(22) Filed: Mar. 4, 2005

(65) Prior Publication Data

US 2006/0092181 A1 May 4, 2006

(30) Foreign Application Priority Data

Nov. 2, 2004 (KR) .................. 10-2004-0088177

(51) Int. Cl.
*G06F 3/00* (2006.01)

(52) U.S. Cl. .............. 715/815; 715/764; 715/704; 715/716; 348/207.99; 348/333.01

(58) Field of Classification Search .............. None
See application file for complete search history.

(56) References Cited

U.S. PATENT DOCUMENTS

| 5,565,887 | A * | 10/1996 | McCambridge et al. .... 715/856 |
| 6,970,199 | B2 * | 11/2005 | Venturino et al. ..... 348/333.02 |
| 6,970,202 | B1 * | 11/2005 | Glogan et al. .............. 348/373 |
| 2005/0088528 | A1 * | 4/2005 | Sambongi et al. ..... 348/207.11 |
| 2005/0111735 | A1 * | 5/2005 | Sheinin ..................... 382/187 |
| 2005/0174457 | A1 * | 8/2005 | Yoshino et al. ......... 348/333.01 |

OTHER PUBLICATIONS

Author:Greg Simsic, Katy Bodenmiller, Title: Create! the nonsense guide to Photoshop Elements 2, Date: 2003, Publisher: Brandon A. Nordin, Pertinent Pages: p. 15-17, 64-66.*
Author: Sony Corporation, Title: Digital Still Camera, Date: 2000, Publisher: Sony Corportation, Pertinent Pages: p. 18, 48, 65.*

* cited by examiner

*Primary Examiner*—Mark Zimmerman
*Assistant Examiner*—David Chu
(74) *Attorney, Agent, or Firm*—Drinker Biddle & Reath LLP

(57) ABSTRACT

Provided are an apparatus and method of displaying an image. In particular, provided are an apparatus and method of controlling an image enlarging/reducing region of a displayed image by resetting a reference point, which is a center point of the displayed image, enlarging/reducing a region of the displayed image with respect to the reset reference point, and displaying the enlarged/reduced region when a location of a displayed region of the displayed image changes within the displayed image. The method of includes: resetting a reference point, which is a center point of a currently displayed image, when a location of a displayed region of the currently displayed image is changed within the displayed image; and enlarging or reducing a region of the displayed image with respect to the reset reference point and displaying the enlarged or reduced region. Thus, there is no need to change the location of the displayed region after enlarging/reducing in order to obtain an image before enlarging or reducing, and a user can easily know which region of the entire image is being displayed.

8 Claims, 8 Drawing Sheets

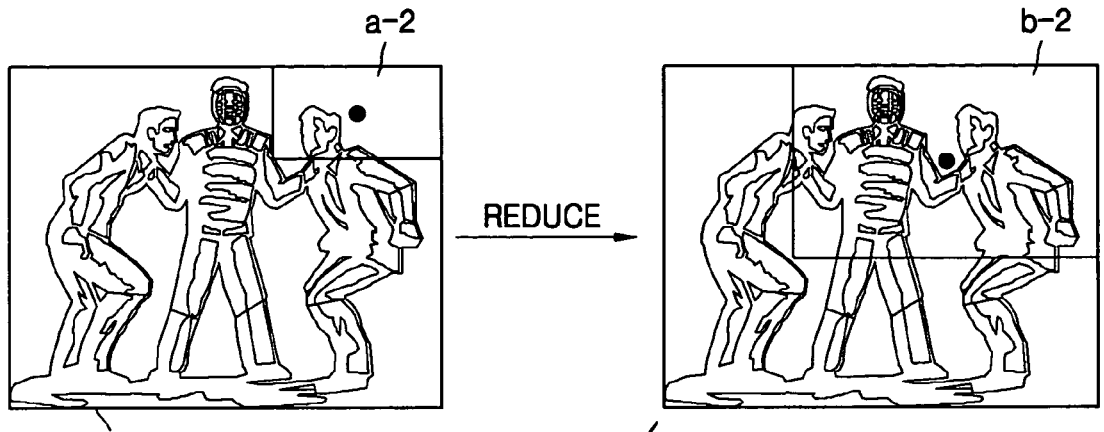
ORIGINAL IMAGE
FIG. 3A
(PRIOR ART)
FIG. 3B
(PRIOR ART)
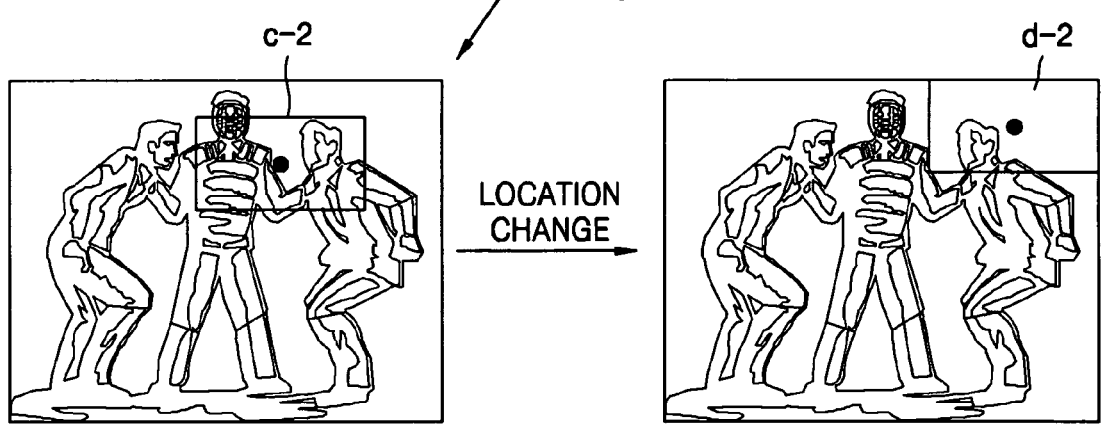
FIG. 3C
(PRIOR ART)
FIG. 3D
(PRIOR ART)

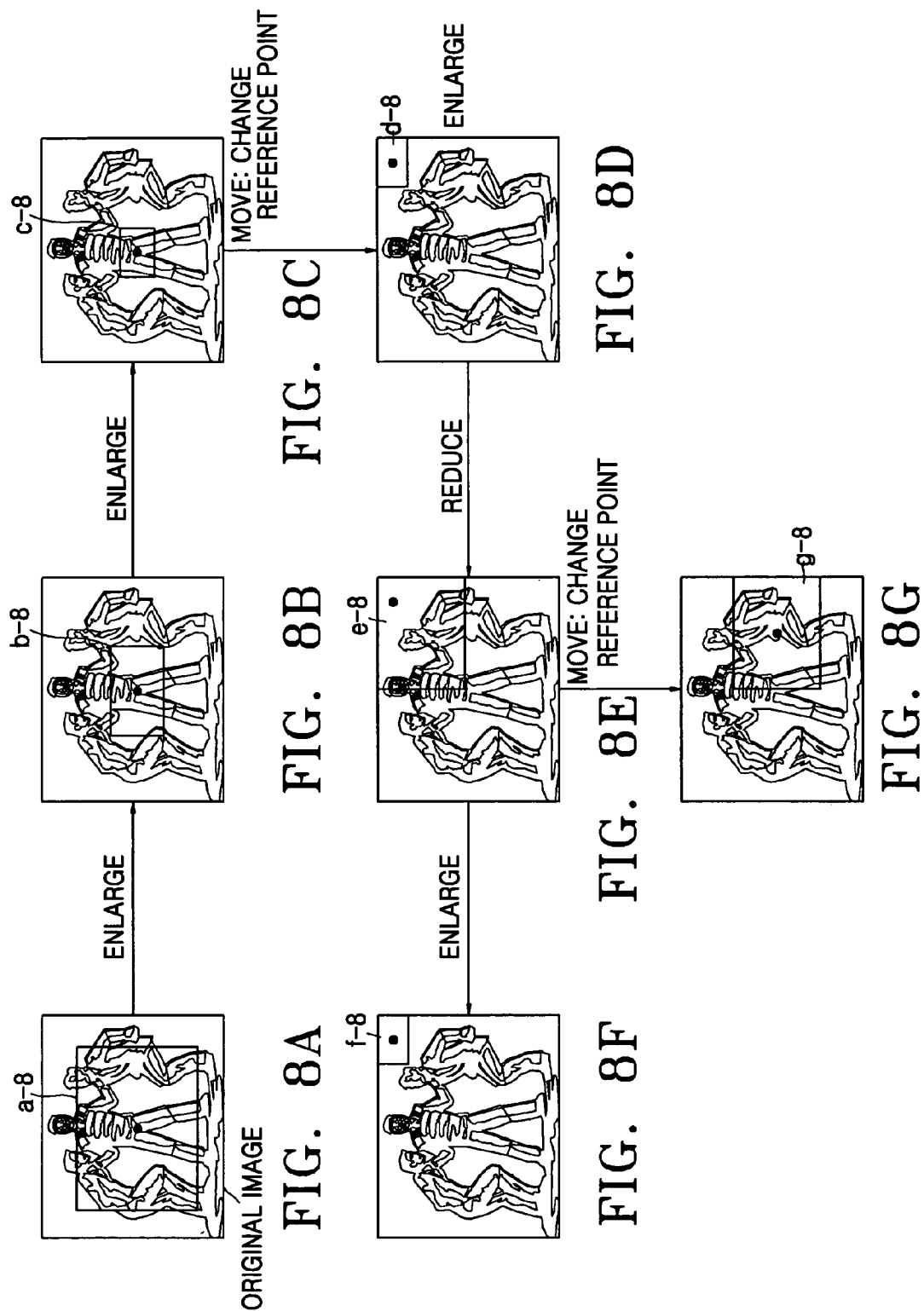

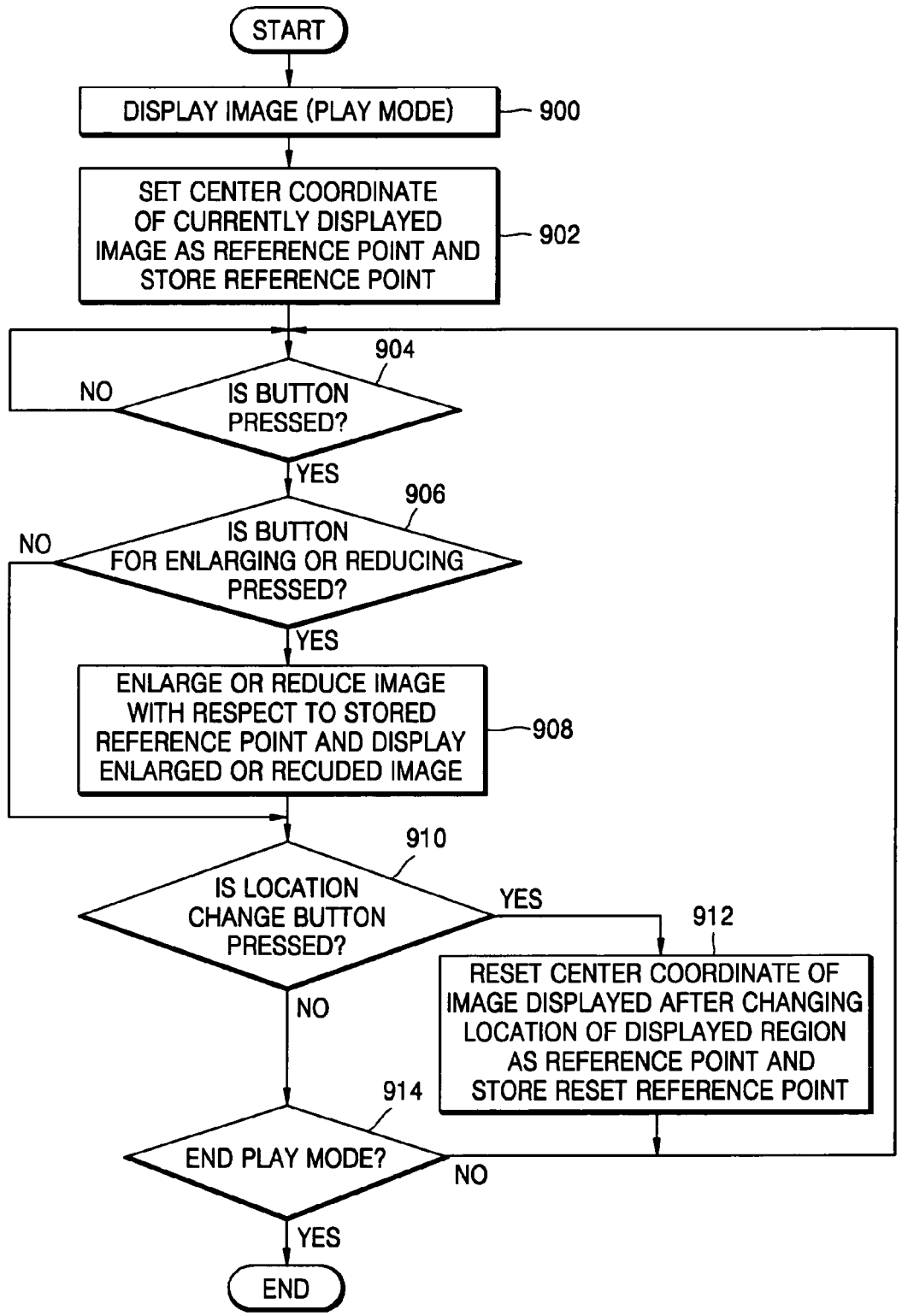

APPARATUS AND METHOD FOR CONTROLLING POSITION OF IMAGE WHEN THE IMAGE ENLARGED OR REDUCED

CROSS-REFERENCE TO RELATED PATENT APPLICATIONS

This application claims the priority of Korean Patent Application No. 10-2004-0088177, filed on Nov. 2, 2004 in the Korean Intellectual Property Office, the disclosure of which is incorporated herein in its entirety by reference.

BACKGROUND OF THE INVENTION

1. Field of the Invention

The present invention relates to an apparatus and method for displaying an image, and more particularly, to an apparatus and method for controlling an image enlarging/reducing region of a displayed image by resetting a reference point, enlarging/reducing a region of the displayed image with respect to a reset reference point, and displaying the enlarged/reduced region when the location of a displayed region is changed from the original displayed image.

2. Description of the Related Art

FIG. 1 is a flow chart illustrating a conventional method for enlarging/reducing an image. Referring to FIG. 1, after an image is displayed on a monitor, display screen or the like (100), a controlling unit (not shown) receives a signal from an enlargement or reduction button is received to enlarge (i.e., zoom in) or reduce (i.e., zoom out), respectively, the displayed image on the monitor (102). Then, the displayed image is displayed after being enlarged or reduced with the center coordinate of the displayed image as a reference point (104).

FIGS. 2A through 2C are views illustrating how a displayed image is enlarged after an enlargement button is pressed while the image is displayed. In FIGS. 2A through 2C, although display screens a-1, b-1, and c-1 are shown in the context of where the displayed image is located relative to an original image, the display screens a-1, b-1 and c-1 should be understood as occupying the entire display monitor.

The display screen a-1 illustrated in FIG. 2A displays a zoomed-in or enlarged region of the original image when the enlargement button is pressed while the original image is displayed. A reference point (●), which is the center of a displayed image, is also the center coordinate of the original image.

The display screen b-1 illustrated in FIG. 2B displays a further zoomed-in or enlarged region of the original image (and the displayed image on the display screen a-1 of FIG. 2A) when the enlargement button is pressed while the display screen a-1 is displayed. A reference point for the image enlargement of the enlarged region displayed on the display screen b-1 remains unchanged and is still the center coordinate of the original image, that is, the same as the reference point of the display screen a-1.

The display screen c-1 illustrated in FIG. 2C displays a still further zoomed-in or enlarged region of the previously enlarged region displayed on the display screen b-1. A reference point for the image enlargement from screen b-1 to screen c-1 still remains unchanged and is the center coordinate of the original image, that is, the same as the reference points of the display screens a-1 and b-1.

As can be appreciated, a reference point in conventional image enlarging and reducing means such as digital cameras is typically the center coordinate of the currently displayed image.

Further, when a displayed image is an enlarged (i.e., zoomed-in) portion of an original image, when a location change button is pressed (106), a displayed region of the original image is changed (i.e., moved) (108). Now, when the enlargement or reduction button is pressed after the region of the original image displayed is changed, the displayed region is enlarged or reduced with respect to the center coordinate of the displayed image, which is not the center of the original image and the enlarged or reduced region is displayed.

FIGS. 3A through 3D are views illustrating how a displayed image is enlarged/reduced after performing the location change described in the method of FIG. 1. In FIGS. 3A through 3D, although display screens a-2, b-2, c-2, and d-2 are shown in the context of where the displayed image is located relative to an original image, the display screens a-2, b-2, c-2, and d-2 should be understood as occupying the entire display monitor.

The display screen a-2 illustrated in FIG. 3A displays an enlarged (i.e., zoomed-in) region of the original image after the location of the displayed region of the image has been changed to the top right-hand corner of the enlarged image. A reference point (●), which is the center of a displayed image, is not the center coordinate of the original image, but is displaced according to the change in the region of the original image that is displayed.

The display screen b-2 illustrated in FIG. 3B displays a reduced (i.e., zoomed-out) region of the image displayed on the display screen a-2 when the reduction button is pressed while the display screen a-2 is displayed. A new reference point for the reduced image is the center coordinate of the display screen a-2. By comparing FIGS. 3A and 3B one can appreciate that the reference point has moved generally downward and left with respect to the original image.

Now, the display screen c-2 illustrated in FIG. 3C displays an enlarged (i.e., zoomed-in) region of the image displayed on the display screen b-2 when the enlargement button is pressed while the display screen b-2 is displayed. A reference point for the image enlargement (i.e., zooming in) of the displayed image is the center coordinate of the display screen b-2 and therefore one can appreciate that the displayed image has been moved (i.e., translated) although only enlarging and reducing operations have been performed.

If the image is reduced and then enlarged from the image displayed on the display screen a-2 with the display region changed, the display screen c-2 is displayed, not the original display screen a-2. Therefore, to obtain the image of the display screen a-2, the location of the displayed region needs to be changed to the display screen d-2 illustrated in FIG. 3D.

When enlarging or reducing an image in a conventional apparatus for displaying an image, a reference point for the enlargement or reduction of an image is the center coordinate of a currently displayed image. Therefore, since a reference point changes when a location of a displayed region of the image is changed, as illustrated in FIGS. 3A through 3D, the location of the displayed region needs to be changed in order to display the image that had its location of the displayed region changed before the enlargement or reduction. In addition, a center coordinate of a displayed image instantly changes when enlarging or reducing an image. Thus, a user may not be aware of which part of an overall image is currently being displayed.

SUMMARY OF THE INVENTION

The present invention provide an apparatus and method for controlling an image enlarging/reducing region by resetting a reference point, which is the center point of a displayed image, and enlarging or reducing a region of the displayed image with respect to the reset reference point and displaying the enlarged or reduced region when a location of a displayed region is changed. Thus, there is no need to change the location of the displayed region after enlarging or reducing in order to display the displayed image before the enlarging or reducing, and a user can easily know which region of the overall image is currently being displayed.

According to an aspect of the present invention, there is provided an apparatus for controlling an image enlarging/reducing region. The apparatus resets a reference point, which is a center point of a displayed image, enlarges or reduces a region of a currently displayed image with respect to the reset reference point, and displays the enlarged or reduced region when a location of a displayed region changes within the currently displayed image.

The enlarged or reduced region is controlled without changing the reset reference point and displayed when the entire region that is enlarged or reduced with respect to the reset reference point cannot be displayed.

A predetermined region of the displayed image is enlarged or reduced with respect to the reference point when enlarging or reducing the displayed image without changing a center coordinate of the displayed image.

The apparatus includes: a button input determiner to determine whether a button for enlarging/reducing the displayed image or a displayed region change button for changing a location of a displayed region of the image within the displayed image is pressed; a reference point setter to set the reference point, which is a center of the displayed image, whenever a new image is displayed, and to reset the reference point according to a pressed button determined by the button input determiner; and a display controller to display the region that is enlarged or reduced with respect to the reference point.

The reference point setter maintains the same reference point if the button for enlarging or reducing the display image is pressed and resets the reference point if the location change button is pressed.

The apparatus further includes a reference point storage unit in which the current reference point and the reset reference point are stored.

The display controller controls the enlarged or reduced region without changing the reference point when the entire enlarged or reduced region of the displayed image after changing the location of the displayed region cannot be displayed.

According to another aspect of the present invention, there is provided a method of controlling an image enlarging/reducing region. The method includes: resetting a reference point, which is a center point of a currently displayed image, when a location of a displayed region of the currently displayed image is changed within the displayed image; and enlarging or reducing a region of the displayed image with respect to the reset reference point and displaying the enlarged or reduced region.

A predetermined region of the displayed image is enlarged or reduced with respect to the reference point when enlarging or reducing the displayed image without changing a center coordinate of the displayed image, and the enlarged or reduced region is displayed.

The enlarged or reduced region is controlled without changing the reset reference point and displayed when the entire region that is enlarged or reduced with respect to the reset reference point cannot be displayed.

BRIEF DESCRIPTION OF THE DRAWINGS

The above and other features and advantages of the present invention will become more apparent by describing in detail exemplary embodiments thereof with reference to the attached drawings in which:

FIGS. 3A through 3D are views illustrating how a displayed image is enlarged/reduced after performing a location change described in the method of FIG. 1;

FIGS. 8A through 8G are views illustrating how images are enlarged/reduced and displayed using the apparatus of FIG. 7 according to an embodiment of the present invention; and FIG. 9 is a flow chart illustrating a method of controlling an image enlarging/reducing region according to an embodiment of the present invention.

DETAILED DESCRIPTION OF THE INVENTION

The present invention will now be described more fully with reference to the accompanying drawings, in which exemplary embodiments of the invention are shown.

Figure 1:
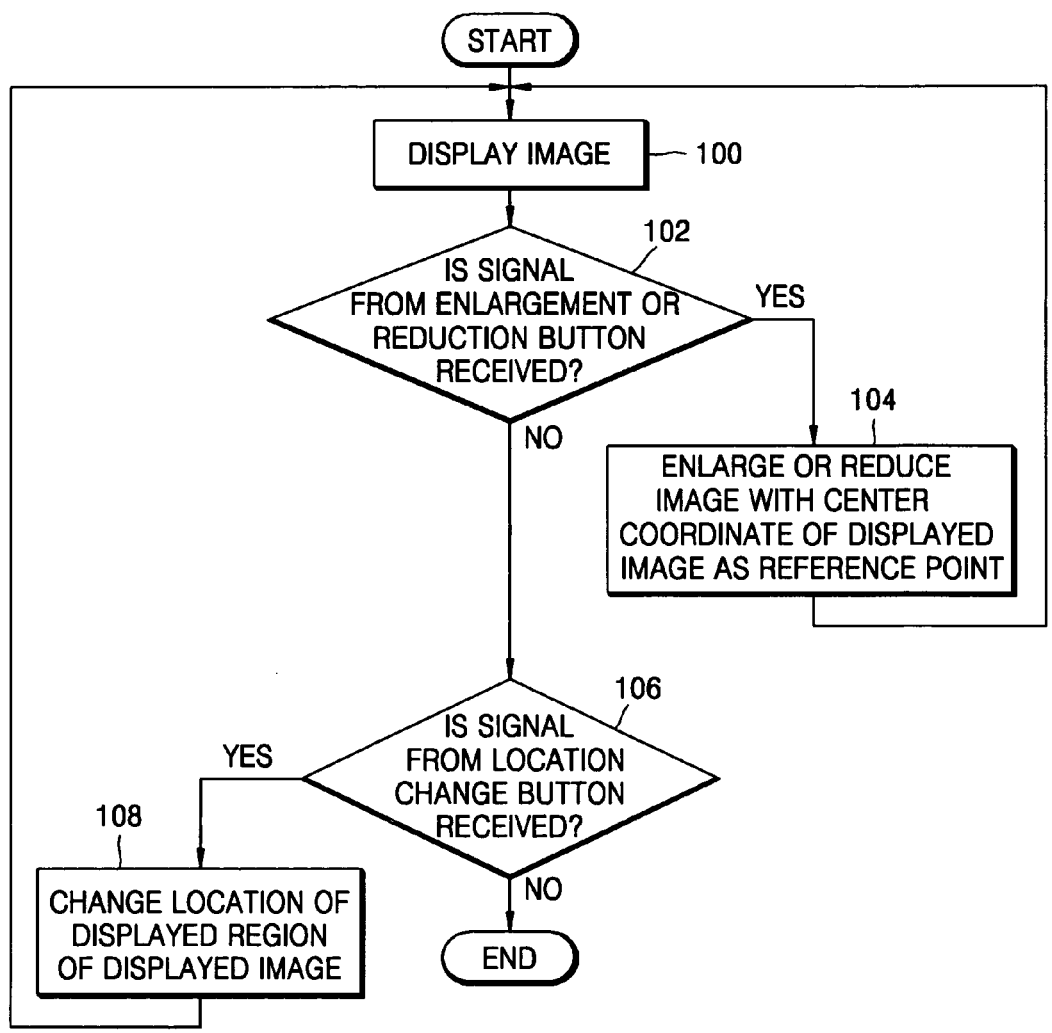
FIG. 1 is a flow chart illustrating a conventional method of enlarging/reducing an image.
Figures 2A, 2B, 2C:
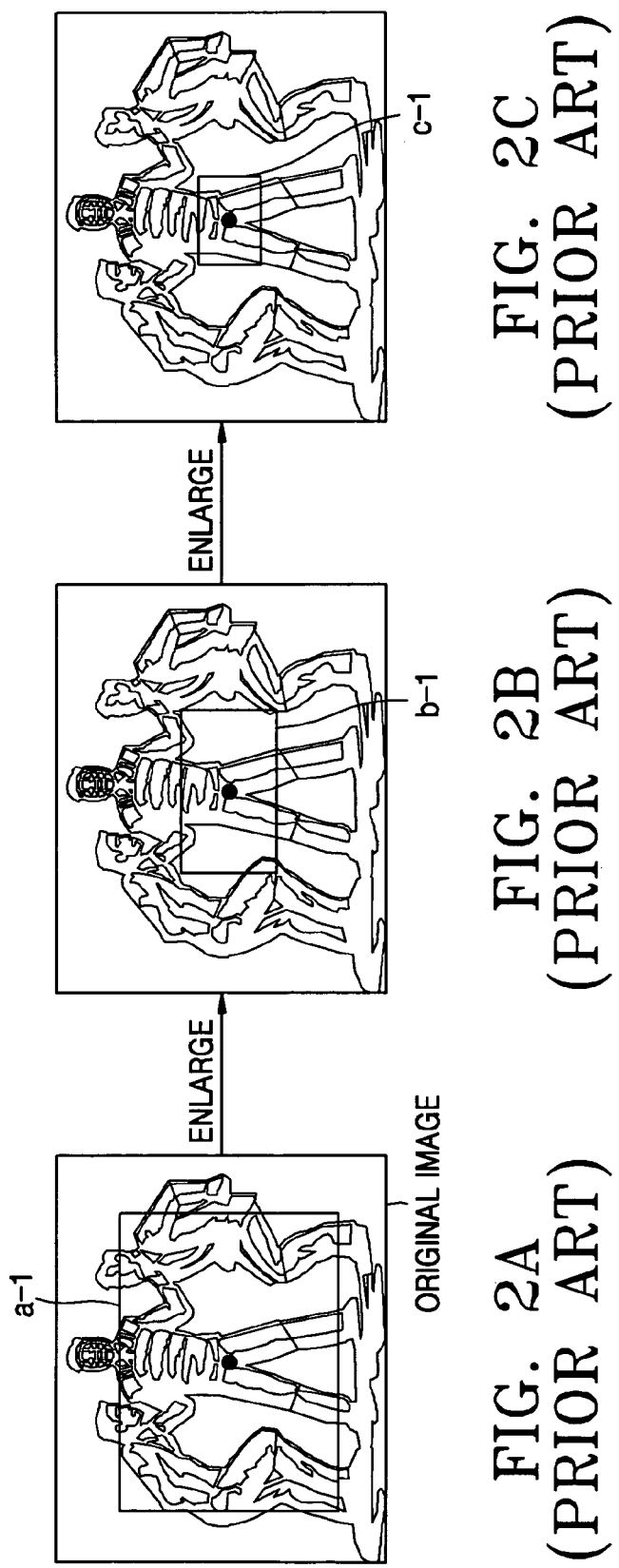
FIGS. 2A through 2C are views illustrating how a displayed image is enlarged after an enlargement button is pressed while the image is displayed using the method of FIG. 1.
Figure 4:
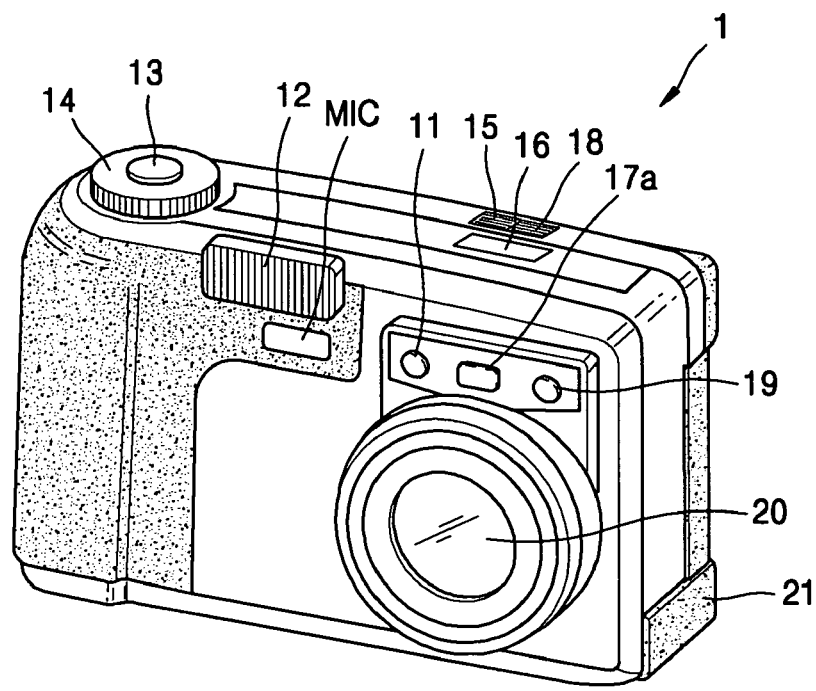
FIG. 4 is a front perspective view of a digital camera according to an embodiment of the present invention.

FIG. 4 is a front perspective view of a digital camera 1 according to an embodiment of the present invention.

Referring to FIG. 4, the digital camera 1 includes a microphone MIC, a self-timer lamp 11, a flash 12, a view finder 17a, a flash light amount sensor (FS) 19, and a lens unit 20 on its front; a shutter button 13, a mode dial 14, a function-select button 15, a photograph-information displaying unit 16, and a function-block button 18 on its top; and an external interface 21 on its side.

The self-timer lamp 11 operates for a predetermined period of time from when the shutter button 13 is pressed until when the shutter button 13 starts to operate when in a self-timer mode.

The mode dial 14 is used by a user to select various operating modes, for example, a still image photographing mode, a night scene photographing mode, a moving picture photographing mode, a play mode, a computer connecting mode, and a system setting mode.

The function-select button 15 is used by a user to select one operating mode from, for example, a still image photographing mode, a night scene photographing mode, a moving picture photographing mode, and a play mode of the digital camera 1.

The photograph-information displaying unit 16 displays various information on each function related to photographing. The function-block button 18 is used by a user to select one of the functions displayed on the photograph-information displaying unit 16.

Figure 5:
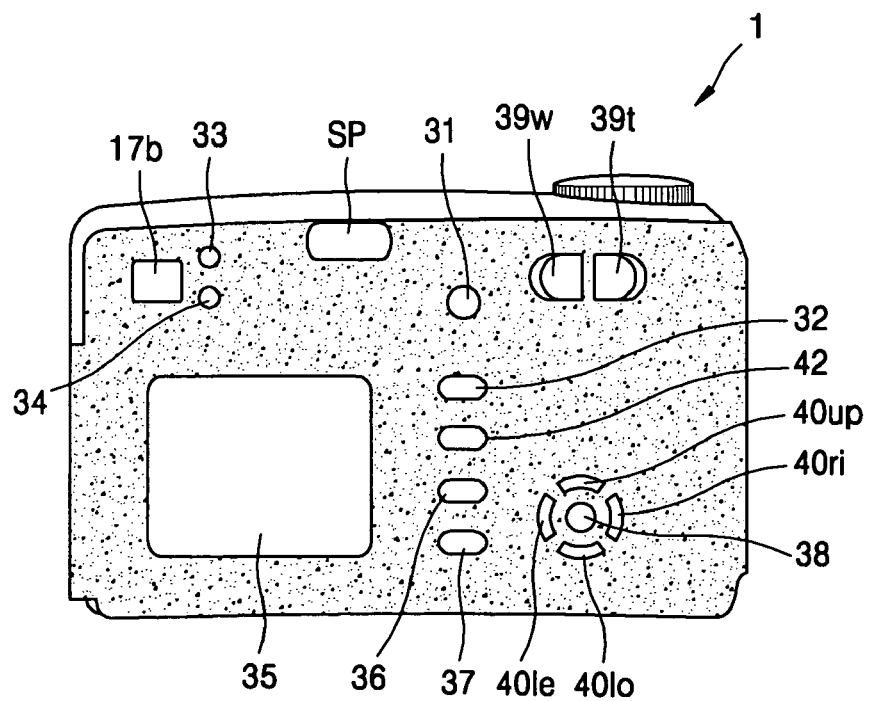
FIG. 5 is a rear view of the digital camera of FIG. 4.

FIG. 5 is a rear view of the digital camera 1 of FIG. 4.

Referring to FIG. 5, a speaker SP, a power button 31, a monitor button 32, an automatic focus lamp 33, a view finder 17*b*, a flash standby lamp 34, a display panel 35 (a liquid crystal display (LCD)), an exposure compensate/delete button 36, an enter/play button 37, a menu/OK button 38, a wide-angle zoom button 39*w*, a telephoto zoom button 39*t*, an up-movement button 40*up*, a right-movement button 40*ri*, a down-movement button 40*lo*, a left-movement button 40*le*, and a playback button 42 are included on the back of the digital camera 1.

The monitor button 32 is used by a user to control the operation of the display panel 35. For example, if the user presses the monitor button 32 a first time, an image of a subject and photographing information of the image are displayed on the display panel 35, when the monitor button 32 is pressed a second time, only the image of the subject is displayed on the display panel 35, and when the monitor button 32 is pressed for the third time the display panel 35 is turned off.

The automatic focus lamp 33 operates when an automatic focusing operation is completed.

The flash standby lamp 34 operates when the flash 12 (see FIG. 4) is on standby.

The exposure compensate/delete button 36 is used to control the exposure when the digital camera 1 is manually operated, or is used as a delete button when a user is setting the operating mode.

The enter/play button 37 is used to input data input by a user or perform various functions, such as stop or play, in the play mode.

The menu/OK button 38 is used to display and select a menu of a mode selected by the mode dial 14.

The up-movement button 40*up*, the right-movement button 40*ri*, the down-movement button 40*lo*, and the left-movement button 40*le* are also used to select the modes and to change a location of a displayed region of an image within a displayed image.

The playback button 42 is used to check and reproduce the last photographed image, moving picture, or audio information.

Figure 6:
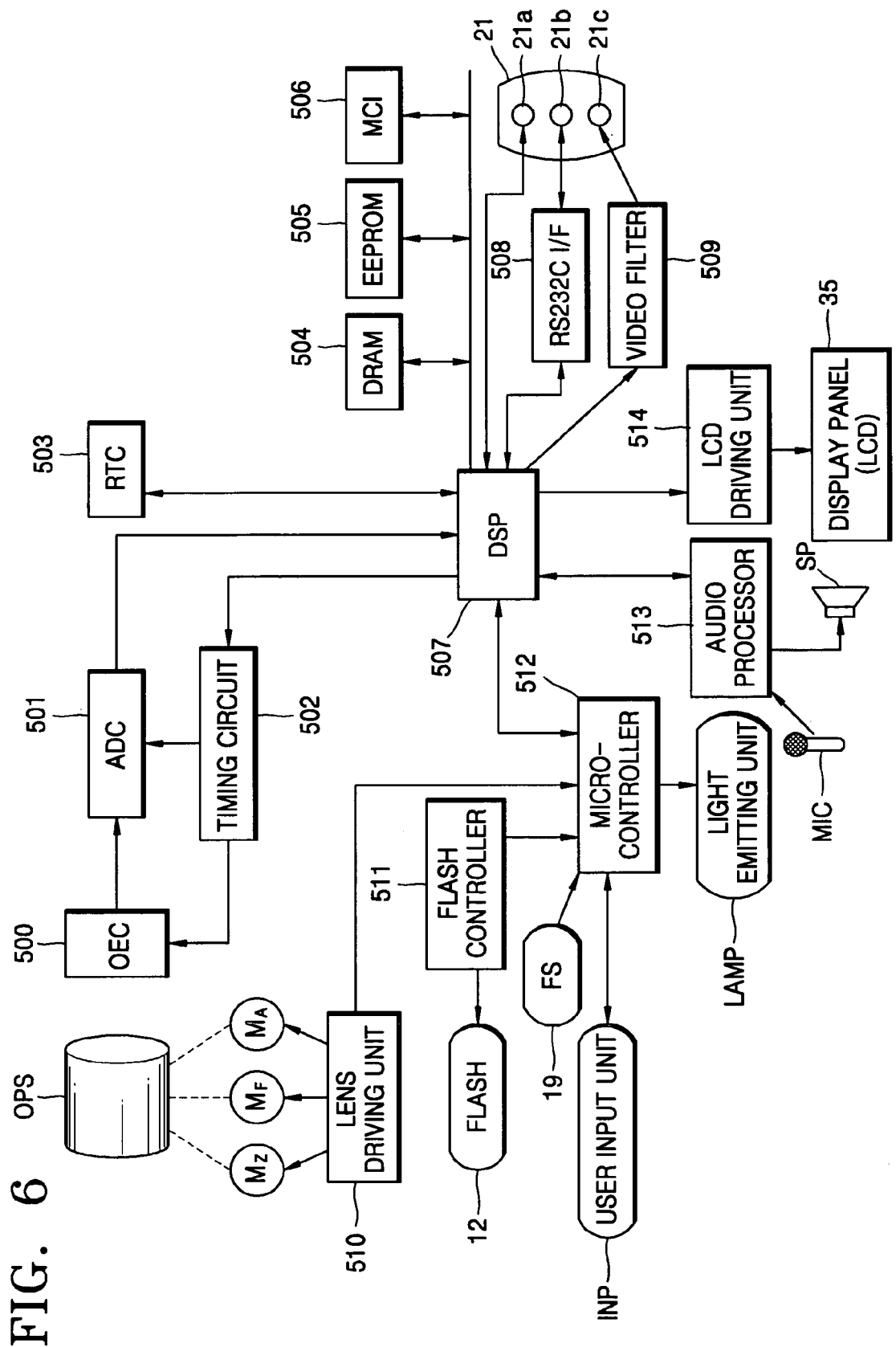
FIG. 6 is a block diagram of the digital camera of FIG. 4.

FIG. 6 is an example block diagram for the digital camera of FIGS. 4 and 5.

Referring to FIG. 6, an optical system OPS including the lens unit 20 optically processes light reflected from a subject. The lens unit 20 of the optical system OPS includes a zoom lens, a focus lens, and a compensation lens (not shown).

If a user presses the wide-angle zoom button 39*w* (see FIG. 5) or the telephoto zoom button 39*t* (see FIG. 5), a signal corresponding to the wide-angle zoom button 39*w* or the telephoto zoom button 39*t* is input to a micro-controller 512. Accordingly, the micro-controller 512 controls a lens driving unit 510, and a zoom motor $M_Z$ operates, thereby moving the zoom lens. That is, if the wide-angle zoom button 39*w* is pressed, a focal length of the zoom lens is shortened, thus increasing the viewing angle. Conversely, if the telephoto zoom button 39*t* is pressed, a focal length of the zoom lens is lengthened, thus decreasing the viewing angle.

$M_A$ denotes a motor to drive an aperture (not shown). A rotation angle of the aperture driving motor $M_A$ differs when in a specific exposure mode and in other mode. The specific exposure mode is when a part of an image desired by a user coincides with a specific area detect region displayed on the display panel 35 of the digital camera 1, a light amount of the digital camera 1 is set based on a mean brightness value of the specific area detect region.

A photoelectric converter OEC of a charge coupled device (CCD) or a complementary metal oxide semiconductor (CMOS) (not shown) converts light from the optical system OPS into electrical analog signals. A digital signal processor (DSP) 507 that is in communication with the micro-controller 512 controls a timing circuit 502 to control the operation of the photoelectric converter OEC and an analog-to-digital converter ADC 501 when the micro-controller 512 receives an image capture signal from the user input INP.

The ADC 501 converts the analog signals from the photoelectric converter OEC into digital signals after removing high frequency noise from and altering the bandwidth of the analog signals.

The DSP 507 processes the digital signal from the ADC 501, and generates a digital image signal divided into a chrominance signal and a luminance signal.

A light emitting unit LAMP that is operated by the macro controller 512 includes the operate/self-timer lamp 11, the automatic focus lamp 33 (see FIG. 5), and the flash standby lamp 34 (see FIG. 5).

A user input unit INP includes the shutter button 13 (see FIG. 4), the mode dial 14 (see FIG. 4), the function-select button 15 (see FIG. 4), the function-block button 18 (see FIG. 4), the monitor button 32 (see FIG. 5), the exposure compensate/delete 36 (see FIG. 5), the enter/play button 37 (see FIG. 5), the menu 38 (see FIG. 5), the wide-angle zoom button 39*w* (see FIG. 5), the telephoto zoom button 39*t*, the up-movement button 40*up* (see FIG. 5), the right-movement button 40*ri* (see FIG. 5), the down-movement button 40*lo* (see FIG. 5), and the left-movement button 40*le* (see FIG. 5).

The digital image signal from the DSP 507 is temporarily stored in a dynamic random access memory (DRAM) 504.

Algorithms needed in the operation of the DSP 507 and setting data are stored in an electrically erasable and programmable read-only memory (EEPROM) 505.

A memory card (not shown) is removably installed in a memory card interface (MCI) 506.

The digital image signal output from the DSP 507 is input to an LCD driving unit 514. As a result, an image is displayed on the display panel 35, that is, an LCD.

The digital image signal output from the DSP 507 can be transmitted as a series communication via a universal serial bus (USB) connector 21*a* or an RS232C interface 508 and its connector 21*b*, or can be transmitted as video signals via a video filter 509 and a video outputting unit 21*c*.

An audio processor 513 outputs an audio signal from the microphone MIC to the DSP 507 or the speaker SP, and outputs an audio signal from the DSP 507 to the speaker SP.

The flash 12 is operated via a flash controller 511 and the micro-controller 512 according to a signal from the FS 19.

Figure 7:
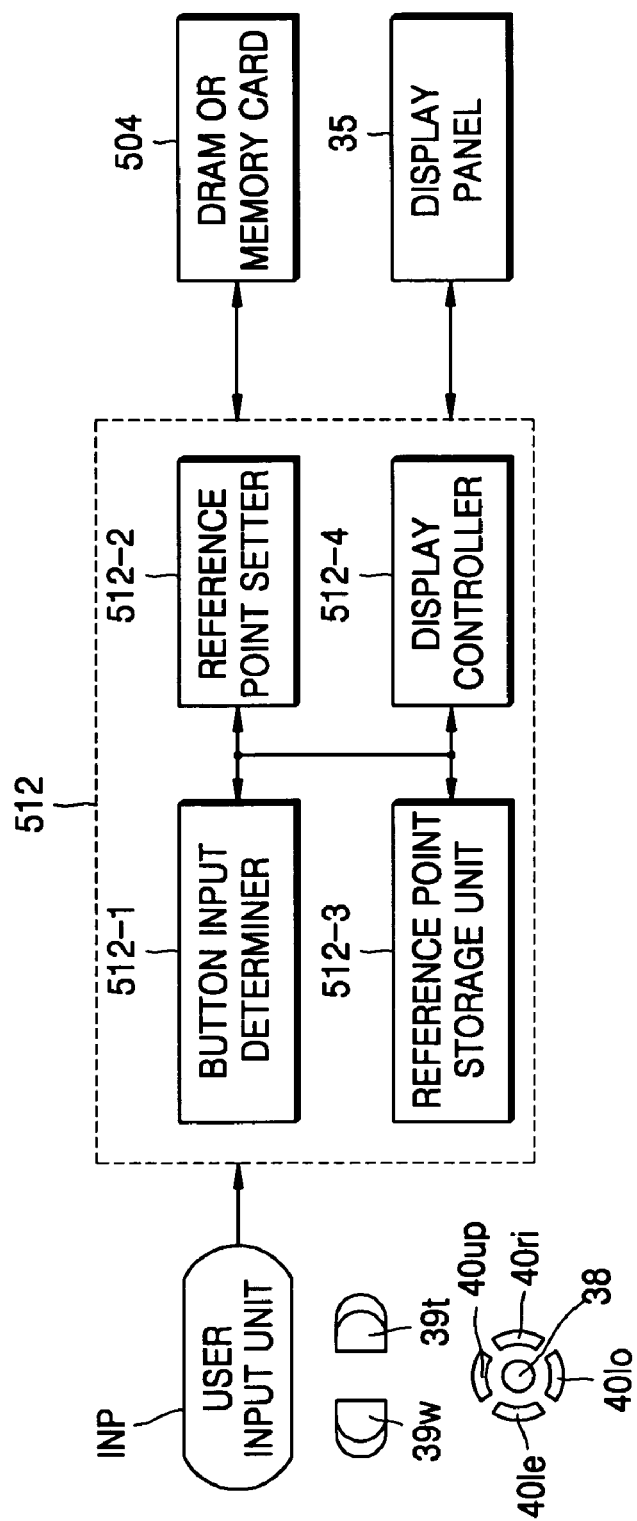
FIG. 7 is a block diagram of an apparatus for controlling an image enlarging/reducing region according to an embodiment of the present invention.

FIG. 7 is a block diagram of an apparatus for controlling an image enlarging/reducing region according to an embodiment of the present invention. The apparatus for controlling the image enlarging/reducing region includes the user input unit INP, the micro-controller 512, the DRAM 504 or the memory card (504 hereinafter for convenience of explaining) storing an image that is to be displayed, and the display panel 35.

The micro-controller 512 resets a reference point, which is a center point of a displayed image, when a location of a displayed region is changed while the current image is being displayed on the display panel 35. Then, the micro-controller 512 enlarges or reduces a predetermined region of the image based on the reset reference point and the image is displayed.

The micro-controller 512 controls the enlarged or reduced region without altering the reference point. When enlarging or reducing the currently displayed image when a location of a displayed region has not been changed within the image displayed on the display panel 35, the micro-controller 512 enlarges or reduces a predetermined region of the currently displayed image and then the image is displayed on the display panel 35.

The micro-controller 512 includes a button input determiner 512-1, a reference point setter 512-2, a reference point storage unit 512-3, and a display controller 512-4.

The button input determiner 512-1 determines whether a button for enlarging or reducing a displayed image, or displayed region change buttons for changing the location of the displayed region within the displayed image is pressed.

The button for enlarging the displayed image is the telephoto zoom button 39*t*, and the button for reducing the displayed image is the wide-angle zoom button 39*w*. The displayed region change buttons used for moving the displayed region of the image within the display panel 35, that is, for changing the displayed region of the image, are the up-movement button 40*up*, the right-movement button 40*ri*, the down-movement button 40*lo*, and the left-movement button 40*le*.

The reference point setter 512-2 sets a reference point, which is a center point of an image displayed on the display panel 35, according to the button that is pressed as determined by the button input determiner 512-1 and stores the reference point in the reference point storage unit 512-3. Whenever a new image is displayed on the display panel 35, first, the reference point setter 512-2 sets a first reference point of the currently displayed image and stores the first reference point in the reference point storage unit 512-3. That is, a reference point set by the reference point setter 512-2 is the center coordinate of the displayed image. Then, when a location of a displayed region of the displayed image is changed, a second reference point of the currently displayed image, which is the center point of the image that is displayed after the location of the displayed region has been changed, is reset and stored in the reference point storage unit 512-3.

If the button input determiner 512-1 determines that the telephoto zoom button 39*t* for enlarging the image or the wide-angle zoom button 39*w* for reducing the image is pressed, the reference point setter 512-2 does not reset the reference point because the first reference point, which is the center point of the currently displayed image, is stored in the reference point storage unit 512-3. Therefore, the display controller 512-4 enlarges or reduces the image based on the first reference point and displays the image on the display panel 35.

FIGS. 8A through 8C illustrate how a displayed image is enlarged after pressing the telephoto zoom button 39*t*. In FIGS. 8A through 8C, display screens a-8, b-8, and c-8 are shown in the context of where the displayed image is located in an original image.

The display screen a-8 in FIG. 8A displays an enlarged region of the original image when the telephoto zoom button 39*t* is pressed while displaying the original image. Here, a reference point (●), which is a center point of the displayed image, is a first reference point stored in the reference point storage unit 512-3.

The display screen b-8 in FIG. 8B displays an enlarged region of the enlarged image displayed on the display screen a-8 when the telephoto zoom button 39*t* is pressed while displaying the display screen a-8. Here, a reference point of the image enlargement is the first reference point.

The display screen c-8 in FIG. 8C displays an enlarged region of the image displayed on the display screen b-8 when the telephoto zoom button 39*t* is pressed while displaying the display screen b-8. Here, a reference point of the image enlargement is the first reference point.

If the button input determiner 512-1 determines that the up-movement button 40*up*, the right-movement button 40*ri*, the down-movement button 40*lo*, or the left-movement button 40*le* for moving the displayed region of the image, that is, for changing the location of the displayed region of the image, is pressed, the reference point setter 512-2 resets a second reference point as the reference point of the displayed region and stores the second reference point in the reference point setter 512-3. If the telephoto zoom button 39*t* or the wide-angle zoom button 39*w* is pressed after the second reference point is reset, the display controller 512-4 enlarges or reduces the image with respect to the second reference point and displays the image on the display panel 35.

FIGS. 8D through 8F illustrate how a displayed image is enlarged/reduced and displayed after changing the location of the displayed region of the image. In FIGS. 8D through 8F, display screens d-8, e-8, f-8, and g-8 are shown in the context of where the displayed image is located in an original image.

The display screen d-8 in FIG. 8D displays a screen that changed its displayed region to the top right hand corner by pressing the up-movement button 40*up* and the right-movement button 40*ri* from the display screen c-8. Here, a reference point (●), which is the center point of the displayed image, is not the reference point of the original image, that is, the first reference point, but is the second reference point reset by the reference point setter 512-2. Since the location of the displayed region of the image is changed by pressing the displayed region change buttons, that is, the up-movement button 40*up* and the right-movement button 40*ri*, the reference point setter 512-2 resets the reference point to the second reference point and stores the second reference point in the reference point storage unit 512-3.

The display screen e-8 of FIG. 8E displays a reduced image that is reduced with respect to the image displayed on the display screen d-8 after pressing the wide-angle zoom button 39*w* while displaying the display screen d-8. Here, a reference point for the reduced image is the center coordinate of the display screen d-8, that is, the second reference point. When the display screen d-8 of FIG. 8D is reduced with respect to the second reference point (in the upper right corner with respect to the original image) the display controller 512-4 controls the reduction such that the display screen e-8 of FIG. 8E is obtained, and the reference point is maintained as the second reference point.

The display screen f-8 of FIG. 8F displays an enlarged region of the image displayed on the display screen e-8 when the telephoto zoom button 39*t* is pressed while displaying the display screen e-8. Here, a reference point for the image enlargement is the second reference point since the displayed region has not changed (i.e., moved). Thus, after consecutive reducing and enlarging operations the display screen f-8 of FIG. 8F is the same as the display screen d-8 of FIG. 8D. As can be appreciated in the present embodiment, display location after a region of the original image is enlarged or reduced does not need to be moved in order to display an image displayed previous to the reducing and enlargement operation. In this manner a user can easily distinguish which region of an entire image is currently being displayed by zooming out and then zooming back in.

The display screen g-8 of FIG. 8G displays a region of the original image below the region of the original image shown in the display screen e-8 after pressing the down-movement button 40*lo*. Here, a reference of the image displayed on the display screen g-8 is a third reference point reset by the reference point setter 512-2. Since the location of the displayed region is changed by pressing one of the displayed region change buttons, that is, the down-movement button 40*lo*, the reference point setter 512-2 resets the reference point and stores the resets reference point in the reference point storage unit 512-3.

FIG. 9 is a flow chart illustrating a method of controlling an image enlarging/reducing region according to an embodiment of the present invention.

When a menu for a play mode provided by the microcontroller 512 is selected, an image is retrieved from the DRAM or the memory card 504 and displayed on the display panel 35 (900).

The reference point setter 512-2 sets a center coordinate of a currently displayed image as a first reference point and stores the first reference point in the reference point storage unit 512-3 (902).

The button input determiner 512-1 determines whether one of the buttons for manipulating the image currently displayed on the display panel 35 is pressed (904).

If one of the buttons for manipulating the currently displayed image is pressed, the button input determiner 512-1 determines whether the telephoto zoom button 39*t* or the wide-angle zoom button 39*w* for enlarging or reducing the currently displayed image on the display panel 35 is pressed (906).

If the telephoto zoom button 39*t* or the wide-angle zoom button 39*w* is pressed, the reference point setter 512-2 maintains the reference point as the first reference point, the display controller 512-4 enlarges or reduces the currently displayed image with respect to the first reference point stored in the reference point storage unit 512-3 and the enlarged or reduced image is displayed on the display panel 35 (908). The details for this operation are illustrated in FIGS. 8A through 8C, and will not be repeated.

Then, the button input determiner 512-1 determines whether the displayed region change buttons are pressed (910). The displayed region change buttons used to change a location of the displayed regions of an image within the display panel 35, that is, to change a location of the displayed regions of the image, are the top-movement button 40*up*, the right-movement button 40*ri*, the down-movement button 40*lo*, and the left-movement button 40*le*. The displayed region change buttons can be pressed after enlarging or reducing an image or after a new image is displayed.

If the displayed region button is pressed, the reference point setter 512-2 resets the reference point to a second reference point and stores the second reference point in the reference point storage unit 512-3 (912).

If the telephoto zoom button 39*t* or the wide-angle zoom button 39*w* is pressed while the displayed region has the second reference point, the display controller 512-4 enlarges or reduces the currently displayed image with respect to the second reference point and displays the image on the display panel 35 (return to 904).

The details of this operation are illustrated in FIGS. 8D through 8F and will not be repeated.

If the telephoto zoom button 39*t* or the wide-angle zoom button 39*w* is not pressed, it is determined whether the play mode has been exited. If the play mode has not been exited, the button input determiner 512-1 stands by to determine whether one of the buttons is pressed (914).

As described above, when a location of a displayed region of a displayed image is changed within the image displayed on a display panel, a reference point, which is a center point of the displayed image, is reset and the displayed image is enlarged or reduced with respect to the reset reference point of the displayed image. Thus, the displayed image with changed displayed region before enlarging or reducing can be displayed without having to change the location of the displayed region of the enlarged or reduced image. In addition, a user can easily know which region of the entire image is being displayed on the display panel.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method for controlling the display of an image stored in a digital camera on a display of the digital camera, the method comprising:

displaying the image on the display of the digital camera;

zooming-in on a first non-central portion of the image being displayed, the first non-central portion occupying substantially an entire area of the display;

setting a first reference point for the first non-central portion of the image;

determining if the first non-central portion of the image is being resized according to a user input;

zooming-in from and zooming-out from the first non-central portion of the image relative to the determining step while maintaining the first reference point as a center of a second non-central portion of the image that includes at least a portion of the first non-central portion of the image;

determining if a third non-central portion of the image adjacent the first non-central portion of the image is being reproduced according to a user input;

changing the first reference point according to the moving step;

detecting a center coordinate of the third non-central portion of the image; and comparing the center coordinate from the detecting step with the first reference point.

2. The method of claim 1 wherein the setting step comprises:

detecting a center coordinate of the first non-central portion of the image; and storing the center coordinate in a memory.

3. The method of claim 1 wherein the changing step further comprises storing the center coordinate of the third non-central portion of the image in a memory.

4. The method of claim 1 wherein the changing step further comprises the step of replacing the first reference point with the center coordinate.

5. A digital camera including a housing, a lens unit on a front side of the housing, a user input including a zoom actuator and a pan actuator, a storage medium including an image file, a display on the rear side of the housing for reproducing the image file as an image on substantially an entire area of the display, and a processor in communication with the user input, the storage medium and the display, wherein the improvement comprises:

a reference point-setting module determining a first reference point of a first non-central, zoomed-in portion of the image, maintaining the first reference point relative to an actuation of the zoom actuator, and determining a second reference point of a second non-central, zoomed-in portion of the image that is adjacent the first non-central, zoomed-in portion relative to an actuation of the pan actuator, wherein the reference point-setting module replaces the first reference point with the second reference point relative to actuation of the pan actuator; determining if a third non-central portion of the image adjacent the first non-central portion of the image is being reproduced according to a user input; changing the first reference point according to the moving step; detecting a center coordinate of the third non-central portion of the image; and comparing the center coordinate from the detecting step with the first reference point.

6. The digital camera of claim 5 wherein the reference point-setting module determines at least one of the first and second reference points according to a center coordinate of at least one of the first non-central, zoomed-in portion, the second non-central, zoomed-in portion and the image.

7. The digital camera of claim 5 wherein the zoom actuator is operative in a photographing mode to control a zoom motor of the lens unit.

8. The digital camera of claim 5 wherein the pan actuator comprises an up-movement actuator, a down-movement actuator, a left-movement actuator and a right-movement actuator.

* * * * *